US010631554B2

(12) United States Patent
Melvin

(10) Patent No.: US 10,631,554 B2
(45) Date of Patent: *Apr. 28, 2020

(54) PROCESS FOR MAKING AN ALCOHOL-CONTAINING FROZEN COMESTIBLE AND PRODUCT THEREOF

(71) Applicant: Gelato Fresco, Inc., Toronto (CA)

(72) Inventor: David H. Melvin, Toronto (CA)

(73) Assignee: GELATO FRESCO, INC., Toronto, Ontario (CA)

( * ) Notice: Subject to any disclaimer, the term of this patent is extended or adjusted under 35 U.S.C. 154(b) by 319 days.

This patent is subject to a terminal disclaimer.

(21) Appl. No.: 14/408,237

(22) PCT Filed: Jun. 14, 2013

(86) PCT No.: PCT/CA2013/000561
§ 371 (c)(1),
(2) Date: Dec. 15, 2014

(87) PCT Pub. No.: WO2013/185210
PCT Pub. Date: Dec. 19, 2013

(65) Prior Publication Data
US 2015/0173393 A1 Jun. 25, 2015

Related U.S. Application Data

(63) Continuation-in-part of application No. 13/826,815, filed on Mar. 14, 2013, now Pat. No. 9,392,808.
(Continued)

(51) Int. Cl.
A23G 9/32 (2006.01)
B60H 1/00 (2006.01)
C12G 3/04 (2019.01)

(52) U.S. Cl.
CPC .......... *A23G 9/325* (2013.01); *B60H 1/00021* (2013.01); *C12G 3/04* (2013.01); *A23V 2002/00* (2013.01); *B60H 2001/00092* (2013.01)

(58) Field of Classification Search
CPC ...... B60H 1/00021; B60H 2001/00092; C12G 3/04; A23G 9/325; A23V 2002/00
(Continued)

(56) References Cited

U.S. PATENT DOCUMENTS 468,073 A 2/1892 Stebbins
2,666,397 A * 1/1954 Skok .................. A23G 9/283
425/226
(Continued)

FOREIGN PATENT DOCUMENTS

CA 937450 11/1973
CA 964921 3/1975
(Continued)

OTHER PUBLICATIONS

Kennedy et al. LIQUEURS/Cream Liqueurs iin Encyclopedia of Food Sciences and Nutrition (Second Edition), 2003 p. 3559 (Year: 2003).*
(Continued)

*Primary Examiner* — Subbalakshmi Prakash
(74) *Attorney, Agent, or Firm* — Thomas A. O'Rourke; Bodner & O'Rourke, LLP

(57) ABSTRACT

A process for making an alcohol-containing frozen comestible substantially devoid of ice crystal agglomerations and/or ice crystal striations and/or trapped air and/or liquids and products thereof is provided. The process comprises rapidly solidifying an alcohol-containing liquid composition so as to produce a substantially single-phase solid alcohol-containing admixture. The single-phase solid alcohol-containing
(Continued)

admixture, and/or pieces thereof, is then tempered by raising the temperature thereof so as to soften the single-phase solid alcohol-containing admixture and/or meld the pieces thereof into a single tempered mass. The single tempered mass is then re-hardened by reducing the temperature thereof. Also, a process for incorporating the single-phase solid frozen alcohol-containing admixture into a non-alcohol-containing composition is provided.

16 Claims, 4 Drawing Sheets

Related U.S. Application Data

(60) Provisional application No. 61/660,314, filed on Jun. 15, 2012.

(58) Field of Classification Search
USPC .......................................................... 426/565
See application file for complete search history.

(56) References Cited

U.S. PATENT DOCUMENTS

| | | | |
|---|---|---|---|
| 3,228,838 A | 1/1966 | Rinfret et al. | |
| 3,405,531 A | 10/1968 | Davis Jr. et al. | |
| 3,412,573 A | 11/1968 | Pauliukonis | |
| 3,572,257 A | 3/1971 | Minor et al. | |
| 3,647,478 A | 3/1972 | Minor et al. | |
| 4,008,580 A | 2/1977 | Heber et al. | |
| 4,031,262 A * | 6/1977 | Nakayama | A23G 9/32 426/565 |
| 4,124,997 A | 11/1978 | Sadjina et al. | |
| 4,251,547 A | 2/1981 | Liggett | |
| 4,374,154 A | 2/1983 | Cole et al. | |
| 4,479,363 A | 10/1984 | Gibson et al. | |
| 4,517,814 A | 5/1985 | Rothstein | |
| 4,569,204 A | 2/1986 | Ott et al. | |
| 4,655,047 A | 4/1987 | Temple et al. | |
| 4,687,672 A | 8/1987 | Vitkovsky | |
| 4,748,817 A | 6/1988 | Oura et al. | |
| 4,761,962 A | 8/1988 | Andersson | |
| 4,843,840 A | 7/1989 | Gibson | |
| 4,848,094 A | 7/1989 | Davis et al. | |
| 4,972,681 A | 11/1990 | Löfkvist | |
| 4,982,571 A | 1/1991 | Marschik et al. | |
| 4,982,577 A | 1/1991 | Milankov et al. | |
| 5,000,012 A | 3/1991 | Löfkvist | |
| 5,084,295 A | 1/1992 | Whelan et al. | |
| 5,126,156 A | 6/1992 | Jones | |
| 5,186,008 A | 2/1993 | Appolonia et al. | |
| 5,186,019 A | 2/1993 | Weyermanns et al. | |
| 5,199,269 A | 4/1993 | Andersson | |
| 5,203,820 A | 4/1993 | Dibbs | |
| 5,223,185 A | 6/1993 | Takei et al. | |
| 5,299,426 A | 4/1994 | Lermuzeaux | |
| 5,356,648 A | 10/1994 | Kortschot | |
| 5,394,705 A | 3/1995 | Torii et al. | |
| 5,403,611 A | 4/1995 | Tomita et al. | |
| 5,522,227 A | 6/1996 | Appolonia | |
| 5,661,981 A | 9/1997 | Laux et al. | |
| 5,664,422 A | 9/1997 | Jones | |
| 5,694,777 A | 12/1997 | Weyermanns | |
| 5,878,582 A | 3/1999 | Appolonia et al. | |
| 5,881,561 A | 3/1999 | Viard | |
| 5,921,091 A | 7/1999 | Foss et al. | |
| 5,948,456 A | 9/1999 | Jones et al. | |
| 5,979,165 A | 11/1999 | Cox et al. | |
| 5,987,898 A | 11/1999 | Olofsson et al. | |
| 6,000,229 A | 12/1999 | Jones et al. | |
| 6,209,329 B1 | 4/2001 | Jones et al. | |
| 6,214,394 B1 | 4/2001 | Beer | |
| 6,216,470 B1 | 4/2001 | Kosock et al. | |
| 6,223,542 B1 | 5/2001 | Jones et al. | |
| 6,308,522 B1 | 10/2001 | Jones et al. | |
| 6,349,549 B1 | 2/2002 | Angus et al. | |
| 6,383,257 B1 | 5/2002 | McDermott et al. | |
| 6,393,859 B1 | 5/2002 | Olsson et al. | |
| 6,401,464 B2 | 6/2002 | Jones et al. | |
| 6,436,454 B1 | 8/2002 | Cox et al. | |
| 6,481,226 B2 | 11/2002 | Jones et al. | |
| 6,494,049 B1 | 12/2002 | Jones et al. | |
| 6,510,890 B1 | 1/2003 | Paskach et al. | |
| 6,539,743 B2 | 4/2003 | Jones | |
| 6,555,154 B2 | 4/2003 | Jones et al. | |
| 6,560,973 B2 | 5/2003 | Jones et al. | |
| 6,574,969 B1 | 6/2003 | Angus et al. | |
| 6,915,896 B2 | 7/2005 | Jones | |
| 6,976,369 B2 | 12/2005 | Nothum, Jr. | |
| 7,062,924 B2 | 6/2006 | Irvine et al. | |
| 7,094,437 B2 | 8/2006 | Solorio et al. | |
| 7,475,554 B2 | 1/2009 | Irvine et al. | |
| 2002/0014081 A1 | 2/2002 | Jones et al. | |
| 2002/0017105 A1 | 2/2002 | Jones et al. | |
| 2002/0129616 A1 | 9/2002 | Jones | |
| 2002/0144608 A1 | 10/2002 | Jones et al. | |
| 2003/0031758 A1 | 2/2003 | Koss et al. | |
| 2003/0215548 A1 * | 11/2003 | Mihajlovic | A23G 9/04 426/101 |
| 2003/0224095 A2 | 12/2003 | DuBois et al. | |
| 2003/0228398 A1 | 12/2003 | Seven et al. | |
| 2004/0137126 A1 | 7/2004 | Solorio et al. | |
| 2004/0219269 A1 | 11/2004 | Cathenaut et al. | |
| 2004/0247747 A1 | 12/2004 | Jones et al. | |
| 2005/0008754 A1 | 1/2005 | Sweeney et al. | |
| 2005/0064074 A1 | 3/2005 | Whiteside et al. | |
| 2005/0072321 A1 | 4/2005 | Larsen | |
| 2005/0106301 A1 | 5/2005 | Jones | |
| 2005/0129810 A1 | 6/2005 | Lindner et al. | |
| 2005/0170054 A1 | 8/2005 | Czark et al. | |
| 2006/0008557 A1 | 1/2006 | Vanitallie et al. | |
| 2006/0013924 A1 | 1/2006 | Jones et al. | |
| 2006/0029710 A1 | 2/2006 | McPherson et al. | |
| 2006/0078651 A1 | 4/2006 | Esghipour | |
| 2006/0093714 A1 | 5/2006 | Nelson | |
| 2006/0105083 A1 | 5/2006 | Brooker et al. | |
| 2006/0115573 A1 | 6/2006 | Singer et al. | |
| 2006/0134274 A1 | 6/2006 | Ladd et al. | |
| 2006/0141102 A1 | 6/2006 | Fleming et al. | |
| 2006/0153961 A1 | 7/2006 | Solorio et al. | |
| 2006/0286248 A1 | 12/2006 | Anfinsen et al. | |
| 2007/0065552 A1 | 3/2007 | Jones et al. | |
| 2007/0092623 A1 | 4/2007 | Shimizu et al. | |
| 2010/0062134 A1 * | 3/2010 | Melvin | A23G 9/06 426/548 |
| 2011/0293813 A1 | 12/2011 | Cavallini et al. | |

FOREIGN PATENT DOCUMENTS

| | | |
|---|---|---|
| CA | 1217351 | 2/1987 |
| DE | 19750679 B4 | 10/2004 |
| EP | 332287 | 9/1989 |
| EP | 0844018 | 5/1998 |
| ES | 2194558 | 11/2003 |
| FR | 2530323 | 1/1984 |
| FR | 2756196 | 5/1998 |
| GB | 1251526 | 10/1971 |
| GB | 1264439 | 2/1972 |
| GB | 2092880 | 8/1982 |
| JP | 04-091749 | 5/1992 |
| JP | 07-08240 | 1/1995 |
| JP | 08-261618 | 10/1996 |
| JP | 09-310943 | 12/1997 |
| JP | 11-151434 | 6/1999 |
| JP | 2002-192519 | 7/2002 |
| KR | 20010076086 | 8/2001 |
| WO | WO 87/04903 | 8/1987 |
| WO | WO 96/29896 | 10/1996 |
| WO | WO 97/046631 | 12/1997 |
| WO | 2000/030468 A1 | 6/2000 |
| WO | WO 00/42862 | 7/2000 |
| WO | WO 01/38804 | 5/2001 |
| WO | WO 01/68230 | 9/2001 |

(56) References Cited

FOREIGN PATENT DOCUMENTS

| WO | WO 01/68231 | 9/2001 |
|---|---|---|
| WO | WO 02/085130 | 10/2002 |
| WO | WO 02/094035 | 11/2002 |
| WO | WO 2005/077200 | 8/2005 |

OTHER PUBLICATIONS

Pallian, J "Vanilla Bourbon Ice Cream"—Foodess.com Mar. 29, 2012. accessed Nov. 11, 2018 (Year: 2012).*

Farmer's Nest "Soda Pop Ice cream" pp. 1-2 Jul. 12, 2010 http://www.thefarmersnest.com/2010/07/soda-pop-ice-cream.html.

Butler "Orange Soda Ice Cream", pp. 1-3 Jul. 12, 2007 http://www.food.com/recipe/orange-soda-ice-cream-electric-ice-cream-maker-240036.

Arbuckle, Ice Cream 2nd Edition, AVI Publishing Company, 1972, pp. 39 and 41.

GMO "Mono and diglycerides" Jul. 5, 2009, pp. 1-2 http://www.gmo-compass.org/eng/database/e-numbers/159.mono_diglycerides.html.

U.S. Appl. No. 13/826,815, filed Mar. 14, 2013.

Abd El-Rahman et al., "Stabilizing effect of bacterial capsules in making frozen yogurt," Egyptian Journal of Diary Sciences, (2000), 28(2) pp. 195-209, ISSN 0378-2700.

Anan. [Hot or cold . . . but what happens on the way home?] Eis oder heiss . . . und was passiert auf dem Heiweg? Verpackungs-Rundschau, (1994), 45(3) pp. 18, 20 ISSN 0042-4307.

Arbuckle, W.S., Ice Cream 2nd Edition, The AVI Pulbishing Company, 1972, pp. 96-98.

Baoning, Yu, "Application of liquid nitrogen freezing technology in production of ice cream," Food and Machinery, (2002) No. 3, pp. 25-26 4, ISSN:1003-5788.

Beck, "Dietetic frozen dessert formula," Ice Cream Trade Journal (1958), 54 No. 4, pp. 84 CODEN:ICTJAM,m ISSN 0096-2031.

Bonenko, Zh. N. et al., [Quick-frozen natural apple juice in plastic packs] Konservnaya I Ovoshchesushil'naya Promyshlennost, (1983), No. 9, pp. 19-20.

Buchmuller, "Liquid nitrogen—a versatile refrigerating agent for the confectionary industry," CCB Review for Chocolate, Confectionary and Bakery (1981) 6(1) pp. 5-8.

Cal-Vidal et al, "Sorption Kinetics of freeze-dried passion fruit juice," In Engineering and Food vol. 1 Engineering Sciences in the food industry G[see FSTA (1986) 18 G4E13] (1984) pp. 509-518.

Clark, "Developments in food freezing, Food Technology," (2002), 56(10) 76-77 ISSN: 0015-6639.

Davies et al., "Gibberellic acid, fruit freezing, and post-freeze quality of "Hamlin" oranges," Hort Technology, (2006) 16(2) pp. 310-305, 11 ISSN:1063-0198.

Gomez-Pastrana Rubio, J.M. [Liquid nitrogen in the ice cream industry.] Alimentacion Equipos y Tecnologia (2002) 21(269) pp. 39-47 ISSN: 0212-1689.

Ice Cream II, Proceeding of the Second IDF International Symposium on Ice Cream, Thessaloniki, Greece, May 2003, published by International Dairy Federation, Brussels, Belgium, pp. 112-123.

Igoe et al, Dictionary of Food Ingredients 3rd Edition, Chapman and Hall, 1996, p. 14.

Kato et al., "Sweeteners for frozen desserts," Japan Fudo Saiensu (1987), 26(4), pp. 42-48 CODEN: JAFSAA, ISSN 0368-1122.

Kazakova et al., [Sucrose replacers for low-calorie ice cream], Kholodil'naya Technical (1994), (3), pp. 33-34 CODEN:KHTEAU, ISSN 0023-214X.

Kebary et al., "Improving viability of bifidobacteria and their effect on frozen ice milk," Egyptian Journal of Dairy Science (1998), 26 (2) pp. 319-336, ISSN 0387-2700.

Keller et al., "Formulation of aspartame-sweetened frozen dairy dessert without bulking agents," Food Technology (Chicago, IL, U.S.) (1991), 45 (2), 102, 104, 106 CODEN;FOTEAO, ISSN 0015-6639.

Marshall et al., Ice Cream, Sixth Ed. 2003 Kluwer Academic/Plenum Publishers, New York . pp. 175-176.

Merin et al., "Structural stability of fresh and frozen-thawed 'Valencia' (*C. sinensis*) orange juice," Journal of Food Science (1984) 49(6), pp. 1489-1493.

Modular cryogenic freezer tunnel. Food Engineering International, Mar. 10, 1985, pp. 52.

Seftalioglu et al., "The stability of aspartame in frozen milky dessert during storage," Doga—Tr. J. of Agricultural and Forestry (1992), (16) pp. 803-809 CODEN: DTOSEO, ISSN 1010-7649.

Sheu et al., "Improving survival of culture bacteria in frozen desserts by microentrapment," Journal of Dairy Science Jul. 1993, vol. 76, No. 7., pp. 1902-1907 Journal Code 29855126R ISSN 0022-0302.

Taylor, "A new cryogenic process for the food industry," Institution of Chemical Engineers Symposium Series (1984) No. 84 pp. 231-240.

\* cited by examiner

PROCESS FOR MAKING AN ALCOHOL-CONTAINING FROZEN COMESTIBLE AND PRODUCT THEREOF

CROSS REFERENCE TO RELATED APPLICATIONS

This application is a U.S. nationalization under 35 U.S.C. § 371 of International Application No. PCT/CA2013/000561, filed Jun. 14, 2013, which claims benefit of priority to U.S. Provisional Patent Application Ser. No. 61/660,314 entitled "PROCESS AND COMPOSITION FOR MAKING AN ALCOHOL-CONTAINING FROZEN COMESTIBLE," filed Jun. 15, 2012, and to U.S. patent application Ser. No. 13/826,815, entitled "PROCESS AND COMPOSITION FOR MAKING AN ALCOHOL-CONTAINING FROZEN COMESTIBLE", filed Mar. 14, 2013. The disclosures set forth in the referenced applications are incorporated herein by reference in their entireties.

FIELD

This invention generally relates to a process for producing alcohol-containing frozen comestibles.

BACKGROUND

In the production of frozen comestibles, such as ice cream, a liquid composition comprising a fat component, a sugar component, a water component, and other flavouring agents are mixed together. The temperature of the composition is generally then reduced to about −5° C. to −8° C. while the mixing continues. Once temperature of the composition has been reduced, it is transferred into vessels for shaping and further freezing until the composition substantially solidifies.

As used herein, the 'comestible' makes reference to an article of food, which may be consumed.

In order to obtain the correct consistency, the degree of freezing required is dependent on the ratio of sugar, fat and other ingredients in the composition. The liquid composition, therefore, is imparted with a "freeze point depression" as a result of the various ingredients affecting the freezing point of the composition. The imparted freeze point depression can be characterized in terms of the sucrose equivalency of the liquid composition. The sucrose equivalency of a given liquid composition includes the contribution of the components of the composition, such as milk solids or glucose components and other ingredients included in the liquid composition. The sucrose equivalency is a measurement known in the industry and is used to compare the freezing requirements of a given liquid composition to the freezing rates and temperature of various concentrations of sucrose in water so as to provide a standard against which to measure the freeze point depression. For example, for a given ingredient in aqueous solution, the equivalent concentration of sucrose that would have the same freezing point depression effect can be calculated. Thus, the sucrose equivalency allows the freezing point depression effect caused by a particular ingredient in the composition to be calculated.

Therefore, when producing many frozen comestibles, the sucrose equivalency of the ingredients is calculated so as to determine the freezing point depression to determine the freezing conditions required to obtain a substantially uniform consistency of the resultant frozen comestible. For example, the ratios of the various ingredients can be adjusted such that the amount of each ingredient results in a substantially consistent freezing point for all the ingredients. However, if an ingredient is present in the liquid composition that has a much higher sucrose equivalency or significantly lower freezing point than the other ingredients, adjustment of the ingredient ratios may not be possible to obtain the desired frozen comestible. The result is that the frozen comestible lacks a smooth consistency since the water component, or other possibly other components, freezes well before the other ingredients.

Furthermore, some ingredients, such as alcohol have a non-linear sucrose equivalency with increasing concentrations in a given fluid medium. Alcohol (ethanol), for example, has a geometrically progressive effect on freezing point depression. For example, a 2.5% concentration equates to a sucrose equivalency of 17, and a 17.5% concentration equates to a sucrose equivalency of 126. The result of freezing liquid compositions which contain alcohol, under conditions hereinabove described, is undesirable as ice crystal agglomerations or ice crystal striations or "pockets" of ice crystals are formed in the frozen comestible and therefore not having a smooth consistency.

Also, with some desirable ingredients, the ratios cannot be adjusted so as to obtain the desired uniform consistency of the frozen comestible while maintaining the desired flavor and other properties of the frozen comestible. As noted above, such pockets of ice crystals are found when freezing liquid compositions that include an alcohol component using the hereinabove described techniques for making a non-alcohol-containing frozen comestible. Therefore, it would desirable to develop a process for freezing compositions that include an alcohol component in which the resulting frozen composition is substantially devoid of ice crystal striations or pockets and has an ice cream-like consistency at a serving temperature. Furthermore, it would be desirable to provide a process for producing a stable frozen alcohol-containing comestible which can be stored and served at product temperatures normally associated with conventional ice creams.

SUMMARY OF THE GENERAL INVENTIVE CONCEPT

The following presents a simplified summary of the general inventive concept herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

In one aspect, there provided a process for the production of an alcohol-containing frozen comestible from a liquid composition comprising a sugar component, a fat component, a water component and an ethyl alcohol component. The process comprises cooling said composition to effect solidification at such a rapid rate by an initial cooling environment so as to effect simultaneous solidification of each of said components to provide a single-phase solid admixture at a solidification temperature. Furthermore, the temperature differential between the initial cooling environment and the liquid composition is sufficiently large to effect the simultaneous solidification at the rapid rate. The rapid rate, in some embodiments, to effect the simultaneous solidification is over a duration of up to about 5 hours. Preferably, the initial cooling environment is at least −28° C.

In a preferred embodiment the liquid composition comprises from about 12% to about 20% of the fat component and from about 15% to about 20% of the ethyl alcohol component.

In some embodiments, the initial cooling environment is provided by solid $CO_2$ or liquid nitrogen where the liquid composition is contained in a first vessel; the solid $CO_2$ or liquid nitrogen is co-placed in a second vessel with the first vessel; and the liquid composition is allowed to solidify in the first vessel.

In some embodiments, the liquid composition is introduced to the initial cooling environment in a shower-type or drop-wise fashion to effect the simultaneous solidification. In further embodiments, the initial cooling environment is provided as a suitably cold contact medium and the liquid composition is contacted with the suitably cold contact medium to effect the simultaneous solidification. The suitably cold contact medium may be provided as solid or cold gaseous $CO_2$ or liquid or cold gaseous nitrogen.

In some embodiments, the process further comprises fracturing the single-phase solid admixture to obtain a plurality of solid single-phase admixture pieces.

In another aspect, the process comprises tempering the single-phase solid admixture by raising the temperature thereof to a temperature in the range of from about −30° C. to about −15° C. for forming at least one single tempered mass. In other embodiments, the process comprises tempering the single-phase solid admixture pieces by raising the temperature thereof to a temperature in the range of from about −30° C. to about −15° C. to effect melding of the single-phase solid admixture pieces into at least one single tempered and melded mass. In some embodiments, the tempering is provided over a duration of up to about 12 hours.

In yet another aspect of the process, the process further comprises subsequently re-cooling the single tempered mass or single tempered and melded single mass to a temperature to effect re-hardening to produce a re-hardened mass. In some embodiments, the re-hardening temperature is below about −30° C.

In still yet another aspect, the process further comprises encapsulating the at least one single mass, at least one single tempered mass or at least one single tempered and melded mass in an ice cream, a sorbet, a frozen yogurt or a frozen dairy product.

In another aspect, the process comprises contacting the single-phase solid admixture or said plurality of single-phase solid alcohol admixture pieces, at a temperature thereof below about −28° C., with a frozen non-alcohol-containing composition. The frozen non-alcohol-containing composition has a temperature of from about −15° C. to about −8° C. and an alcohol-containing composition and non-alcohol-containing composition in a visually distinct aggregation is formed. In some embodiments, the frozen non-alcohol-containing composition is an ice cream, a sorbet, a frozen yogurt or a frozen dairy product. In some embodiments, veins, striations and/or pockets of the single-phase solid admixture or the plurality of single-phase solid alcohol admixture pieces are interlaced within the non-alcohol-containing composition by at least partial mixing of the single-phase solid admixture or the plurality of single-phase solid alcohol admixture pieces with the non-alcohol-containing composition for forming the alcohol-containing composition and non-alcohol-containing visually distinct aggregation. In further embodiments, the alcohol-containing composition and non-alcohol-containing composition visually distinct aggregation is subsequently re-cooled said to a temperature to effect re-hardening of the alcohol-containing composition and non-alcohol-containing composition visually distinct aggregation. In some preferred embodiments, the re-cooling is performed below about −20° C. to effect the re-hardening of the alcohol-containing composition and non-alcohol-containing composition visually distinct aggregation. In preferred embodiments, the alcohol-containing frozen comestible has an alcohol content of from about 1% to about 15%.

In various embodiments, as described herein, the process provides an alcohol-containing frozen solid single-phase admixture comestible, an alcohol-containing frozen single tempered mass comestible, an alcohol-containing frozen single tempered re-hardened mass comestible, an alcohol-containing frozen solid, tempered or re-hardened mass comestible, an alcohol-containing frozen visually distinct aggregated comestible, or an alcohol-containing frozen visually distinct re-hardened aggregated comestible.

In yet another aspect, according to various embodiments, as described herein, there is provided an alcohol-containing frozen comestible comprising a sugar component, a fat component, an alcohol component and a water component having a single-phase solid admixture at a temperature of less than −30° C.

In some embodiments, there is provided an alcohol-containing frozen comestible comprising a sugar component, a fat component, an alcohol component and a water component having at least one single tempered mass at a temperature of between about −30° C. to about −15° C.

In some embodiments, there is provided an alcohol-containing frozen comestible comprising a sugar component, a fat component, an alcohol component and a water component having at least one hardened single tempered mass re-cooled at a temperature of less than about −30° C. to produce the at least one hardened single tempered mass, which, for example, in further embodiments may be encapsulated in an ice cream, a sorbet, a frozen yogurt or a frozen dairy product. Furthermore, in some embodiments, the at least one hardened single tempered mass may be interlaced in the ice cream, sorbet, frozen yogurt or frozen dairy product so as to be visually distinct from the ice cream, sorbet, frozen yogurt or frozen dairy product. The interlaced at least one visually distinct hardened single tempered mass may be provided as veins, striations or pockets interlaced in the ice cream, sorbet, frozen yogurt or frozen dairy product.

In some embodiments, there is provided an alcohol-containing frozen comestible comprising a sugar component, a fat component, an alcohol component and a water component having a soft at least one single tempered mass encapsulated in an ice cream, a sorbet, a frozen yogurt or a frozen dairy product. In some embodiments the soft at least one single tempered mass may be interlaced in a non-alcohol-containing composition. The at least one single tempered mass may be provided as being visually distinct from the non-alcohol-containing composition. In preferred embodiments the non-alcohol-containing composition may be provided as an ice cream, a sorbet, a frozen yogurt or a frozen dairy product and the soft at least one single visually distinct tempered mass may be provided as veins, striations and/or pockets in said non-alcohol-containing composition.

In one aspect, there is provided a process for producing an alcohol-containing frozen comestible having a substantially uniform frozen consistency from a multi-component, alcohol-containing liquid composition. The process comprising:

a) solidifying the alcohol-containing liquid composition at a rate to effect substantially simultaneous freezing of each of the components to produce a single-phase solid alcohol-containing admixture;

b) tempering the single-phase solid alcohol-containing admixture by raising the temperature thereof to a temperature in the range of from about −30° C. to about −15° C. for forming at least one tempered single mass; and c) re-hardening the at least one tempered single mass by re-cooling the at least one tempered single mass to a temperature of below about −15° C.

BRIEF DESCRIPTION OF THE DRAWINGS

In order that the invention may be better understood, exemplary embodiments will now be described by way of example only, with references to the accompanying drawings, wherein.

DESCRIPTION OF THE EXEMPLARY EMBODIMENTS

Figure 1:
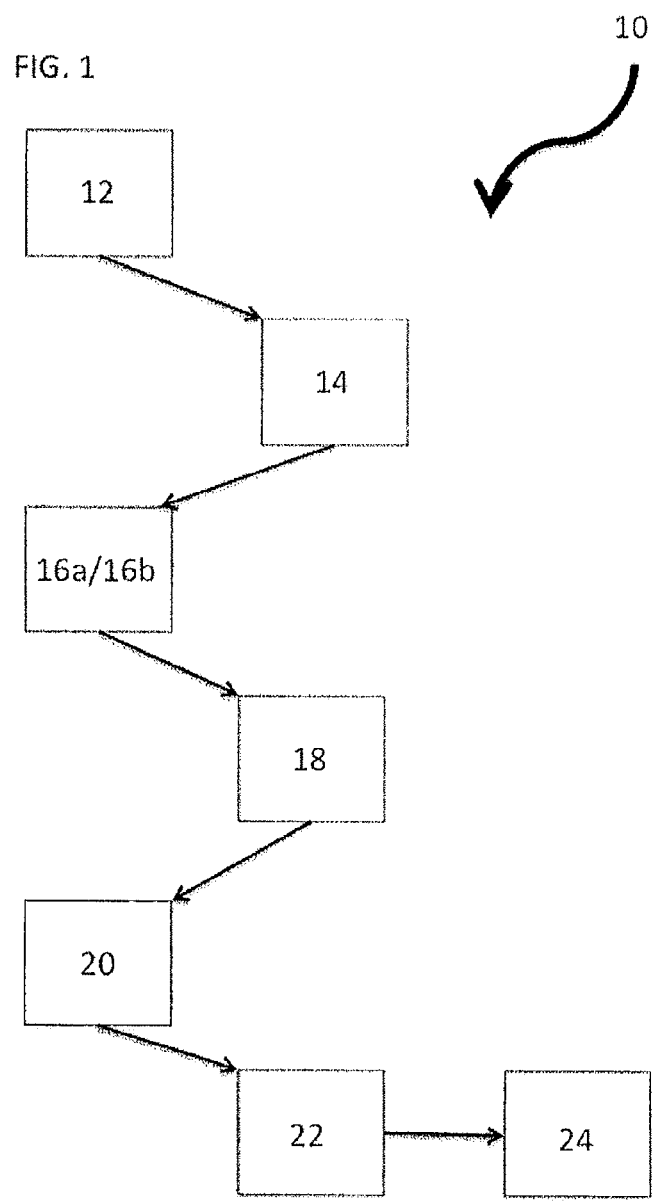
FIG. 1 is a schematic flow diagram of an embodiment of the process.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items. However, other alternative physical or other configurations are possible which are considered to be within the teachings of the instant disclosure.

Figure 2:
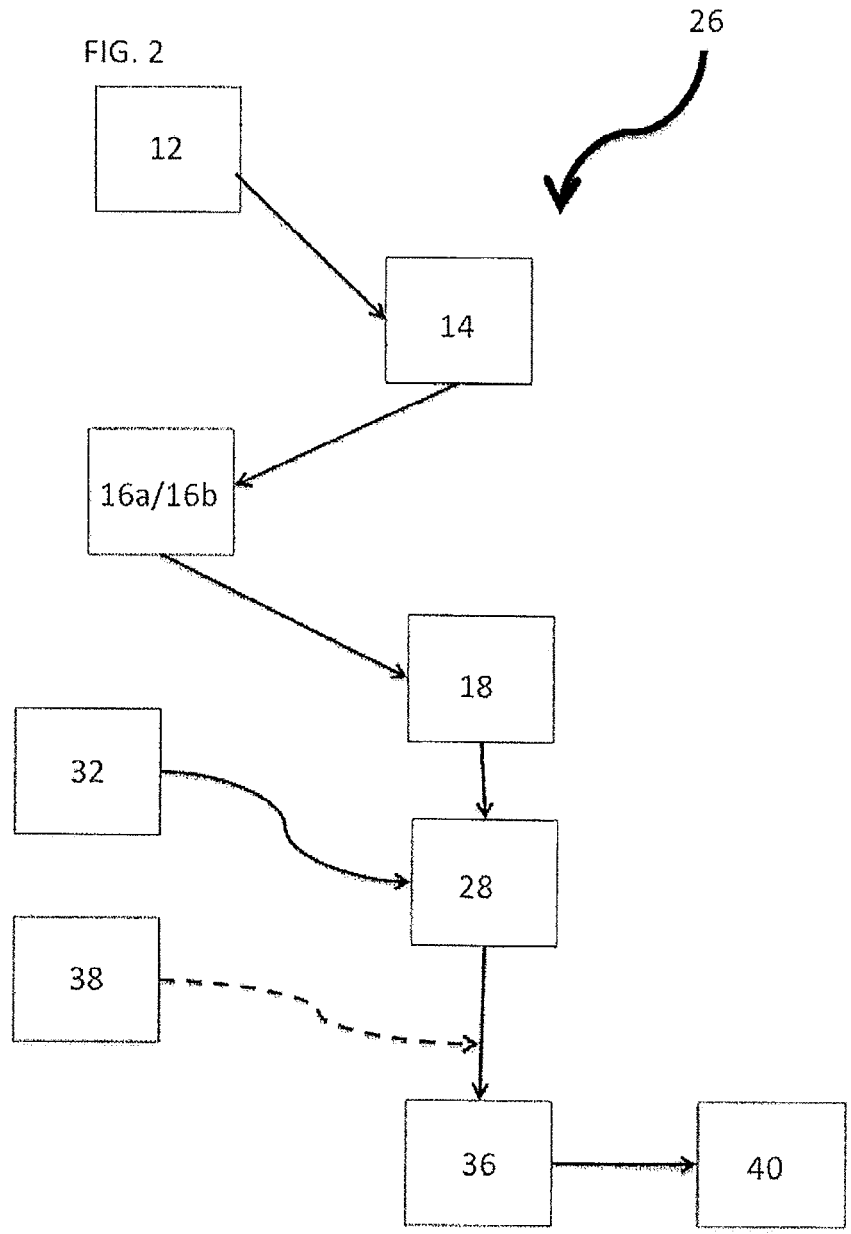
FIG. 2 is a schematic flow diagram of an embodiment of the process.

With reference to FIGS. 1 and 2, schematic processes of exemplary embodiments are provided generally at 10 and 26, respectively. An alcohol-containing liquid composition 12 comprising a sugar component, a fat component, an alcohol component and a water component is introduced to an initial cooling environment 14 suitable to produce a substantially single-phase solid alcohol-containing admixture 16a. The terminology of "single-phase" with respect to the solidification of the alcohol-containing liquid composition 12, as used in the instant disclosure, means a temperature below which all components of the alcohol-containing liquid composition 12 solidify substantially simultaneously so as to produce the single-phase solid alcohol-containing admixture 16a at a solidification temperature. Conversely, in conventional ice cream production processes, as the temperature in such processes is decreased, the water component first freezes, followed by, at a further time point, the fat component thereby leading to the inclusion of trapped air portions and unfrozen liquid sugar/water mixture (which remains as a liquid at −8° C., the temperature of the initial freezing in conventional ice cream production processes).

The initial cooling environment as shown at 14, in some exemplary embodiments of the instant disclosure, may be below a temperature of about −28° C. However, depending on the rate at which it is desired that the alcohol-containing liquid composition 12 needs to be solidified, the initial cooling environment 14 may be at least −30° C., −40° C., −50° C., −60° C., −78.5° C. (the temperature of solid $CO_2$ (dry ice)), −196° C. (the temperature of liquid $N_2$ (liquid nitrogen)). The rate at which the alcohol-containing composition needs to be solidified may, for instance, be dependent on the concentration of alcohol therein. Therefore, there are several factors that may be considered when choosing the temperature of the initial cooling environment 14, such as, for example, the size and shape of a first vessel 42 used to contain the alcohol-containing liquid composition 12 in some exemplary embodiments, whether the alcohol-containing liquid composition 12 is poured or sprinkled to come into contact with dry ice or liquid nitrogen, whether an air blast freezer is used to solidify the alcohol-containing liquid composition 12 to the single-phase solid alcohol-containing admixture 16a or pieces 16b thereof and the percentage alcohol content of the liquid composition. The temperature of the initial cooling environment 14 is thus chosen to ensure a rapid rate of solidification of the alcohol-containing liquid composition 12 to the single-phase solid alcohol-containing admixture 16a or pieces 16b thereof having a substantially uniform consistency.

For example, in some exemplary embodiments, the alcohol-containing liquid composition 12 may be contacted with a contact medium, such as, for example dry ice or liquid nitrogen, such that the temperature of the initial cooling environment 14 may be near about −78.5° C. or −196° C., the temperature of dry ice or the boiling point of liquid nitrogen, respectively. Resultant from the contact is the rapidly solidified single-phase solid alcohol-containing admixture 16a, which in some instances may also include pieces 16b thereof.

As used herein the term "initial cooling environment" 14 may thus encompass temperatures as noted above, for example, generally those below −28° C. The temperature differential between the initial cooling environment 14 and the alcohol-containing liquid composition 12 is to be sufficiently large so as to effect the simultaneous solidification of the alcohol-containing liquid composition 12 to the single-phase solid alcohol-containing admixture 16a. The alcohol-containing liquid composition 12, in the initial cooling environment 14 undergoes a rapid rate of solidification, or in some embodiments, a substantially flash-freeze and results in the single-phase solid alcohol-containing admixture 16a, as noted above. However, the rapid rate of solidification may be over a duration of up to about 5 hours (or greater) so long as the rate at which heat is dissipated from the alcohol-containing liquid composition 12 allows for the creation of the single-phase solid admixture substantially devoid of ice crystal striations, agglomerations or pockets. Surprisingly, it has been discovered that the simultaneous solidification of each of the components of the alcohol containing liquid composition to produce the uniformly consistent single-phase solid admixture 16a can take place over an extensive period of time, e.g. up to several hours depending on the volume of the liquid to be solidified. This is clearly in contrast to the instantaneous flash freezing of aqueous solutions. Such an initial cooling environment may be created, for example, through use of liquid nitrogen or dry ice and subjecting the alcohol-containing liquid composition 12 to a liquid nitrogen bath or dry ice. The initial cooling environment 14, in some embodiments may also be created by a freezer capable of reaching temperatures below about −28° C. or by way of co-placing the alcohol-containing liquid composition 12 in a first vessel 42 and co-placing the first vessel in a second larger vessel 44 with dry ice or liquid nitrogen, as discussed below.

Figure 3:
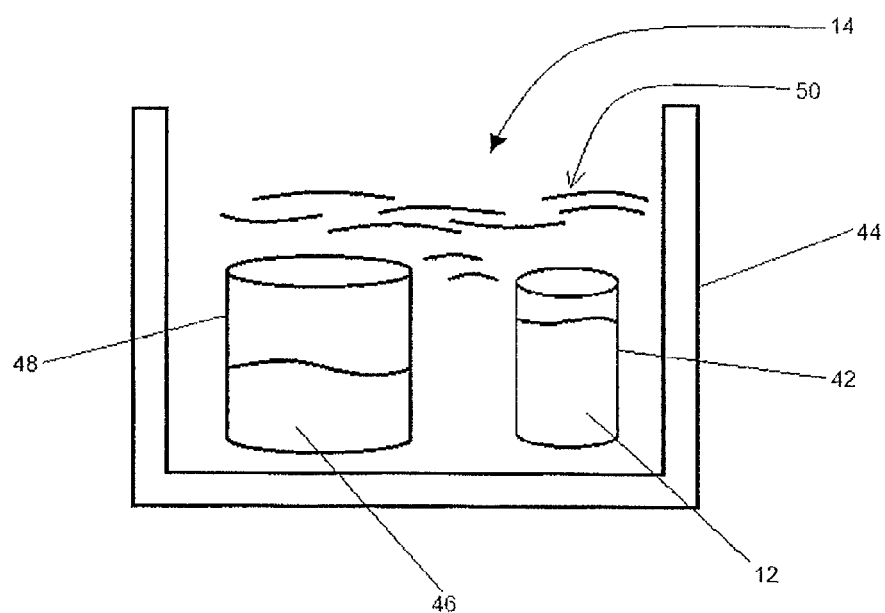
FIG. 3 is cut-away schematic diagram of an exemplary initial freezing environment where the alcohol-containing liquid composition is frozen by cold gases.

Turning now to FIG. 3, an exemplary embodiment for solidifying the alcohol-containing liquid composition 12 in the initial cooling environment 14 is discussed. A first vessel 42 of suitable size and shape is selected so as ensure a rapid solidification rate of the alcohol-containing liquid composition 12 resulting in the single-phase solid alcohol-containing admixture 16a/16b substantially devoid ice crystals or agglomerates thereof. Inclusions of ice crystals or agglomerates thereof are considered to be non-single-phase solid compositions or admixtures. The first vessel 42 is co-placed in second vessel 44 which is larger than the first vessel 42 such that the first vessel 42 can be placed therein, along with dry ice or liquid nitrogen 46 to provide the required level of cooling. The second vessel 44, in some embodiments (not shown), may have a lid or cover so as to provide an enclosed second vessel. However, if the sides of the second vessel 44 are higher than that of the first vessel 42, cold gases shown schematically at 50, from the dry ice or liquid nitrogen remain low in the second vessel 44 and thus cool the alcohol-containing liquid composition 12 in the second vessel 44. Therefore, in order to provide the initial cooling environment 14, a lid or cover to the second vessel may not be required. Furthermore, in preferred embodiments, the dry ice or liquid nitrogen is not placed in direct contact with the first vessel 42 and is thus physically separated from the first vessel by some means, for example an open upper end container 48, as shown in FIG. 3, or another form of a barrier. Using dry ice or liquid nitrogen to provide the cooling in the second vessel may provide a temperature environment 14 of about −28° C. and in preferred embodiments below about −60° C. However, depending on the required rate of solidification of the alcohol-containing liquid composition 12, the initial cooling environments 14 may be provided below at least about −28° C. and in some embodiments below about −30° C., −40° C., −50° C. Other considerations regarding the initial solidification temperature may be the size and shape of the first vessel, the alcohol content of the liquid composition as well as quantity of the alcohol-containing liquid composition desired to the frozen solid, as noted above.

Figure 4:
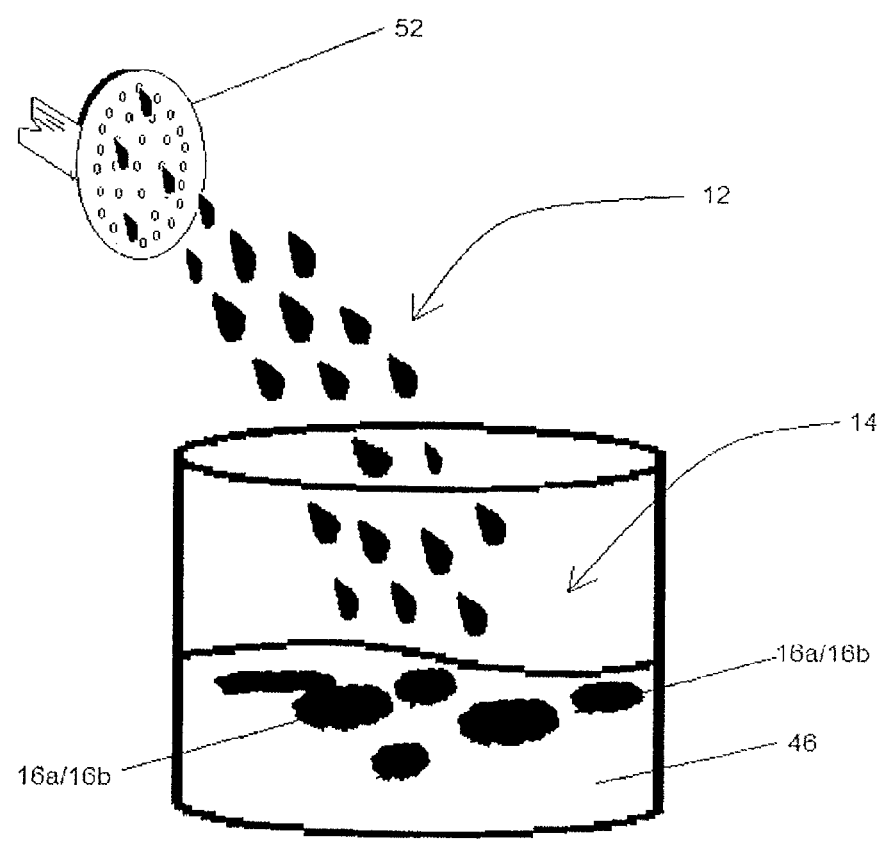
FIG. 4 is a schematic diagram of an exemplary initial freezing environment where the alcohol-containing liquid composition is frozen by contact with a nongaseous cold contact medium.

With respect to the single-phase solid alcohol-containing admixture 16a, one or more pieces of single-phase solid alcohol-containing admixture pieces 16b may result from the introduction of the alcohol-containing liquid composition 12 to the initial cooling environment 14. As schematically shown in FIG. 4, for example, in some embodiments, the alcohol-containing liquid composition 12 may be poured into a contact medium, such as a liquid nitrogen bath or over dry ice (a cold contact medium 46), from a shower head or similar means as shown schematically at 52. In other exemplary embodiments, the alcohol-containing liquid composition 12 may be similarly showered or sprinkled, as a stream or as droplets, into the liquid nitrogen bath or over dry ice 46 from suitable means 52. In other exemplary embodiments, the alcohol-containing liquid composition 12 may be added dropwise to liquid nitrogen bath or over dry ice 46. In still other exemplary embodiments, the alcohol-containing liquid composition 12 may be subjected to cold gaseous $CO_2$ or cold gaseous nitrogen such as the cold gases emanating from solid $CO_2$ or liquid nitrogen in the phase transition state. Therefore, when the alcohol-containing liquid composition 12 contacts the liquid nitrogen 46 or the dry ice 46, the initial solidification or temperature environment 14 is provided at near about −196° C. or −78.5° C., respectively. The alcohol-containing liquid composition 12 may also be poured, showered or sprinkled through, for example a refrigerated air chamber environment cooled to below about −30° C. or cooler. Other suitable nongaseous cold contact mediums 46 will be apparent to those of skill in the art to realize the single-phase solid alcohol-containing admixture or pieces thereof from reading the instant description.

The single-phase solid alcohol-containing admixture 16a or the single-phase solid alcohol-containing admixture pieces 16b, may, in some instances, be further subjected to fracturing at 18 as shown in FIGS. 1 and 2 so as to provide the plurality of single-phase solid alcohol-containing admixture pieces 16b within a predetermined size range. The predetermined single-phase solid alcohol-containing admixture pieces 16b size range may, for example, be from a dust-like sized particle having a size of less than about 1 mm in cross-sectional lengths to about 15 cm in cross-sectional lengths. In some embodiments, other sizes of predetermined single-phase solid alcohol-containing admixture pieces 16b outside of the abovementioned range may also be made and be suitable.

Now, with respect to the exemplary process as schematically shown in FIG. 1 specifically, once the plurality of single-phase solid alcohol-containing admixture pieces 16b are obtained, they are assembled into a suitably sized tempering and/or melding vessel at 20 so as to temper and/or meld together and soften. The single-phase solid alcohol-containing admixture pieces 16b are then tempered by warming from the temperature resulting from the initial cooling environment 14 to a temperature of from about −30° C. to about −15° C. at 20, where the single-phase solid alcohol-containing admixture pieces 16b meld together and form a tempered and/or melded and tempered single mass 22 which is substantially free from ice crystal agglomerates and/or ice crystal striations or the like embedded in the single mass 22 as well as trapped air and liquid portions.

In some embodiments where single-phase solid alcohol-containing admixture pieces 16b are not present and as such a single-phase solid alcohol-containing admixture 16a is obtained, the single-phase solid alcohol-containing admixture 16a is tempered at a temperature of about −30° C. to about −15° C. at 20, preferably of about −28° C. Regardless of whether a single-phase solid alcohol-containing admixture 16a and/or pieces 16a thereof are obtained, the single tempered and/or tempered and melded mass 22 is softened at the abovementioned temperature range so as to attain the desired "creaminess" or smoothness consistent with that of ice cream. Furthermore, in the formation of the single mass 22, the temperature may be held substantially constant at about −28° C. to about −25° C., as shown at 20, until the single-phase solid alcohol-containing admixture pieces 16b have melded together and have formed into the desired single mass 22 with the desired level of "creaminess" in some embodiments. Moreover, in some exemplary embodiments, the time for which the single-phase solid alcohol-containing admixture 16a and/or pieces 16b thereof are tempered as noted above in the softening and/or melding vessel is up to about 12 hours. Therefore, in some embodiments, the single-phase solid alcohol-containing admixture 16a and/or pieces 16b thereof are tempered by slowly or gradually warming to effect softening and/or melding. Subjecting the single-phase solid alcohol-containing admixture pieces 16b to the temperatures and time period noted provides for a gradual warming of the single-phase solid alcohol-containing admixture pieces 16b such that they can meld into the single tempered and melded mass 22, or in some embodiments, soften the single-phase solid alcohol-containing admixture 16a to the single tempered mass 22 to the desired level of "creaminess" without damage and to maintain the integrity of the single-phase, discussed below. The desired level of "creaminess" can be determined by the size of any ice crystals, preferably devoid thereof or as small as possible, and the amount of total solids; creaminess thus a function of the combination of the two.

Thus resultant single-phase solid alcohol-containing admixture is warmed or, in other words, tempered to a consistency or softness of conventional ice cream. In contrast, in the production a conventional non-alcohol-containing ice cream, the liquid composition is frozen to a still flowable state or soft ice cream consistency and then further frozen to a harder consistency.

Although size of the tempering vessel (the softening and/or melding vessel) at 20 may be variable, in some exemplary embodiments, suitably sized vessels have a volume of from about 10 ml to about 1000 ml. In other exemplary embodiments the volume of the suitably sized vessels is from about 250 ml to about 750 ml. And in further exemplary embodiments, the suitably sized vessel has a volume of about 500 ml. Additionally, although the shape of the vessel may be chosen from a variety of available container shapes available, in some exemplary embodiments, the container shape is generally cylindrical.

Continuing with reference to FIG. 1, once the single tempered and/or melded mass 22 has been desirably formed, it is subsequently then re-cooled in final freezing environment to effect re-hardening to produce a re-hardened mass 24. The re-hardened mass 24 can then be stored, packaged, served, consumed, or used as a component in the further production of a frozen comestible. In some exemplary embodiments, the final freezing environment has a temperature below about −30° C. In some embodiments, the final freezing temperature may be from below about −35° C. to about −115° C. In some exemplary embodiments, the temperature is held substantially constant at about −60° C. Such a final freezing environment, for example, may be created by subjecting the single tempered and/or melded mass 22 to a dry ice (solid $CO_2$) or liquid nitrogen, a temperature-controlled environment or other means for providing temperature-controlled environment, such as a freezer capable attaining such temperatures. Although not required, the re-hardened mass 24 frozen comestible is desirably warmed to serve at temperature of from about −30° C. to −22° C.

By initially rapidly solidifying the alcohol-containing liquid composition 12, the resultant single-phase solid alcohol-containing admixture 16a is substantially devoid of ice crystal agglomerates, trapped air and liquids. Tempering by increasing the temperature thereof then causes the single-phase solid alcohol-containing admixture 16a to soften to a degree where it forms into the single tempered mass 22 having a desired consistency of creaminess. However, with the temperature being less than the melting point of water and ethanol (for the concentrations provided herein), the sucrose equivalency of the initial alcohol-containing liquid composition 12, as a result of other ingredients present, allows the single-phase solid alcohol-containing admixture pieces 16b to meld together to the single tempered and melded mass 22 without the water components melting to a point where ice crystals can form. In other words, the water component of the processes disclosed herein may not thaw independently and form liquid droplets, which on re-hardening form ice crystals and ice crystal agglomerates, thus rendering a non-uniform inconsistency to the frozen alcohol-containing composition as is noted in conventional techniques. Therefore, as the single-phase solid alcohol-containing admixture 16a and pieces 16b thereof are warmed from the initial cooling environment 14 to the from about −30° C. to about −15° C. tempering environment, as noted above, the single-phase is preserved and maintained as the single-phase solid alcohol-containing admixture 16a and pieces 16b are merged to form the single tempered and melded mass 22.

Unlike the instant process, in the production of conventional non-alcoholic ice cream, the composition used make the ice cream is frozen in an ice cream machine to a soft ice cream consistency and then allowed to harden in a freezing environment. Therefore in conventional ice cream production processes, the starting liquid composition of sugars, fats, water, etc., is not rapidly frozen solid, then warmed and hardened as in the instantly described processes. Furthermore, in conventional ice production processes, the water component freezes first and then the other components freeze in order of increasing sucrose equivalency.

With respect to the final freezing to from the re-hardened mass 24, the frozen comestible may be further utilized in a frozen treat, for example, as a centre for an ice cream ball treat. In such an example, the single tempered mass 22 or re-hardened mass 24 is scooped or otherwise partitioned and encased in a covering of regular ice cream or in some embodiments, a frozen dairy product, a frozen yogurt or a sorbet or other enrobing composition suitable for encasing the frozen comestible. By encasing the frozen comestible in ice cream, since the frozen comestible has a higher melting point than regular ice cream owning to the inclusion of the alcohol component, a substantially leak-proof delivery system is created, which can be consumed. Furthermore, the encasement of the frozen comestible by the ice cream may also serve to insulate the frozen comestible and thus slow the thawing process. In some exemplary embodiments, the frozen comestible encased in ice cream may be further coated in a suitable comestible dusting comprising a granulated material so as to provide a desired appearance and handling characteristics.

With reference to FIG. 2 specifically, in another exemplary embodiment, once the single-phase solid alcohol-containing admixture 16a and admixture pieces 16b are subjected to fracturing at 18, if required, as noted above, at least one single-phase solid alcohol-containing admixture piece 16b is contacted, at 28, with a frozen non-alcohol-containing composition 32. The non-alcohol-containing composition 32 may be, for example, an ice cream, a frozen dairy product, a frozen yogurt or a sorbet or other suitable enrobing composition, as noted above, such as a chocolate. However, other non-alcohol-containing frozen compositions may be suitable. Other sizes of single-phase solid alcohol-containing admixture pieces 16b outside of above noted range may also be used in some embodiments. In some exemplary embodiments, the plurality single-phase solid alcohol-containing admixture pieces 16b are provided with cross-sectional lengths of about 50 mm. The plurality of single-phase solid alcohol-containing admixture pieces 16b are contacted with the frozen non-alcohol-containing composition 32 when the temperatures of each are respectively below about −28° C. and from about −15° C. to about −8° C. In some exemplary embodiments, when the single-phase solid alcohol-containing admixture pieces 16b are added at 28, the temperature thereof is about −30° C., −40° C., −50° C., −60° C., −78.5° C. (the temperature of solid $CO_2$ (dry ice)), −196° C. (the temperature of liquid $N_2$ (liquid nitrogen)), depending on whether the substantially single-phase solid alcohol-containing admixture has been re-hardened, in some embodiments, following the tempering and/or melding step at 20, for example, in the exemplary process noted above. In such a step, the temperature of the single-phase solid alcohol-containing admixture 16a and/or pieces 16b thereof is below that of the temperature of the frozen non-alcohol-containing composition 32. In preferred embodiments, the non-alcohol-containing composition 32 is provided at about −8° C.

The single-phase alcohol-containing admixture pieces 16b and the non-alcohol-containing composition 32, introduced to one another, thus become what is termed herein as an alcohol-containing composition and non-alcohol-containing composition visually distinct aggregation 36. Additionally, as shown by the dashed line at 38, the alcohol-containing admixture pieces 16b and the non-alcohol-containing composition 32 may be optionally mixed by a suitable means of mixing or, at least partial mixing, in order that the resultant alcohol-containing frozen comestible includes visually distinct "veins" and/or striations and/or pockets and/or other inclusions of the single-phase solidified alcohol-containing admixture having a substantially uniform consistency desirably intermixed or interlaced therein.

The non-alcohol-containing composition 32 then becomes an insulating medium for the single-phase alcohol-containing admixture 16a/16b. At 40, as shown in FIG. 2, the alcohol-containing composition and non-alcohol-containing composition visually distinct aggregation 36 is portioned as desired and packaged in a vessel, for example, as those described above, and placed in an environment having a temperature of below about −15° C. so as to re-harden to an alcohol-containing frozen comestible as shown schematically at 40 in FIG. 2. In some embodiments, the environment for re-hardening the alcohol-containing composition and non-alcohol-containing composition visually distinct aggregation 36 is maintained at about −20° C., whereas in other exemplary embodiments the temperature of the environment is maintained at about −25° C.

With regard to the embodiment shown schematically in FIG. 2, without wishing to be bound by theory, the single-phase alcohol-containing admixture 16a/16b upon contacting the relatively warmer non-alcohol-containing composition 32 causes the warming of the single-phase alcohol-containing admixture pieces 16a/16b and the tempering and/or melding thereof to form the visually distinct striations or veins of the single-phase alcohol-containing admixture pieces 16b, as discussed above. Also, although the heat transfer noted above occurs, the non-alcohol containing composition 32 rapidly freezes on contact around the single-phase alcohol-containing admixture so as to form a sheath of the non-alcohol-containing composition around the single-phase alcohol-containing admixture pieces so as produce the veins. Thus, the non-alcohol-containing composition 32 then freezes around the single-phase alcohol-containing admixture resulting in the alcohol-containing composition and non-alcohol-containing composition visually distinct aggregation 36. The non-alcohol-containing composition 32 thus encapsulates the alcohol-containing admixture after a degree of softening and/or melding (tempering) has taken place, thus producing a vein and/or pocket and/or striation and/or other shaped inclusion of the single-phase alcohol-containing admixture.

Additionally, with particular regard to the embodiment referencing FIG. 2, the concentration of alcohol in the alcohol-containing composition and non-alcohol-containing composition visually distinct aggregation 36 can thus be varied, as desired, by varying the amount of the single-phase alcohol-containing admixture added to the non-alcohol-containing composition 32. For example, in some exemplary embodiments, the amount of single-phase alcohol-containing admixture may be varied such that the concentration of alcohol in the resultant alcohol-containing composition and non-alcohol-containing composition visually distinct aggregation 36 is from about 1% to about 15%. In some exemplary embodiments, the concentration of alcohol in the alcohol-containing composition and non-alcohol-containing composition visually distinct aggregation 36 may be about 5%. Therefore, an end user may measure standard alcohol servings, particularly when the frozen comestible is standardly packaged to provide a desired number of alcohol servings. For example, the frozen comestible may be packaged such that the alcohol content is approximately equal to a standard alcohol serving, for example the equivalent of a 45 ml serving of spirits.

In addition to the above-discussed process embodiments, there is provided an initial alcohol-containing liquid composition 12 suitable for use in conjunction with the process disclosed herein. As noted herein, the various ingredients in a liquid composition will affect the sucrose equivalency of the liquid composition and thus the ingredients contained therein will alter the freezing point depression of a given liquid. In some exemplary embodiments, the initial alcohol-containing liquid composition 12 may have a sugar component, a fat component of from about 12% to about 20% and an alcohol component of from about 15% to about 22%, wherein the remainder of the initial alcohol-containing liquid composition 12 is substantially comprised of water and optionally, additional flavoring and/or preservation agents, which are know to those of skill in the art. For example, the initial alcohol-containing liquid composition 12 may include a sugar component, about 16% of a fat component and from about 16% to about 19% of an alcohol component wherein the remainder of the composition is comprised of water and optionally flavoring and/or preservation agents.

EXAMPLE 1

For exemplary purposes, a Bailey's Irish Cream™ based liquid alcohol composition, having a sugar component of about 20%, a fat component of about 16% and an alcohol component of about 17% was used in embodiments described herein. The Bailey's Irish Cream™ liquid composition was introduced to a liquid nitrogen bath and rapidly or flash solidified to a single-phase solid Bailey's Irish Cream™ admixture so as to produce solid Bailey's Irish Cream™ pieces. The solid Bailey's Irish Cream™ pieces were then packaged in 500 ml cylindrical vessels and subjected to an environment having a temperature of about −25° C. for a time period of about 12 hours until the solid Bailey's Irish Cream™ pieces had tempered and substantially melded into a single tempered and melded mass of the frozen Bailey's Irish Cream™ composition. The frozen Bailey's Irish Cream™ composition, being melded into a single tempered and melded mass, was then subjected to an environment having a temperature of about −35° C. for re-hardening and stored at a temperature of about −35° C.

EXAMPLE 2

Additionally, for exemplary purposes, a Grand Marnier™ based liquid alcohol composition, having a sugar component of about 20%, a fat component of about 16% and an alcohol component of about 18.7% was used in embodiments described herein. The Grand Marnier™ liquid composition was introduced to a liquid nitrogen bath and rapidly solidified to a solid Grand Marnier™ composition so as to produce frozen, solid Grand Marnier™, pieces. The solid Grand Marnier™ pieces wherein packaged in 500 ml cylindrical vessels and subjected to an environment having a temperature of about −25° C. for a time period of about 12 hours until the solid Grand Marnier™ pieces had tempered and substantially melded into a single tempered and melded mass of frozen Grand Marnier™. The frozen Grand Marnier™ composition, being melded into a single mass, was then subjected to an environment having a temperature of about −35° C. for re-hardening and stored at a temperature of about −35° C.

EXAMPLE 3

In another example, 500 ml of Bailey's Irish Cream™ was placed into a 1 L vessel (first vessel) and placed in an enclosed space (second vessel) with liquid nitrogen. The liquid nitrogen was not in direct contact with first vessel. As the liquid nitrogen converted to a gas, the cold nitrogen gas or vapours cooled the enclosed space, to a temperature of about −60° C., as measured by an infrared thermometer. The temperature of the Bailey's Irish Cream™ was allowed to equilibrate to the −60° C. temperature of the enclosed space and thus rapidly solidify to a single-phase solid alcohol-containing admixture. Once solidified, the solid alcohol-containing Bailey's Irish Cream™ composition was stored overnight at about −30° C. to a softened (tempered) single mass relative the solid alcohol-containing Bailey's Irish Cream™ composition as described above. The resultant product showed similar consistency characteristics to that of the embodiment of Example 1, that being substantially devoid of ice crystals and ice crystal agglomerates, however the consistency was not as creamy as the product of Example 1.

EXAMPLE 4

Testing was conducted similar to that described above with respect to Example 3, however the temperature of the enclosed space and thus the solid alcohol-containing Bailey's Irish Cream™ composition varied in each test to be about −28° C., −30° C., −40° C. and −50° C. in the various tests. In each case, the resultant solid alcohol-containing Bailey's Irish Cream™ composition was stored at −28° C. overnight to form a softened (tempered) single mass relative the solid alcohol-containing Bailey's Irish Cream™ composition. Following the tempering step, the products obtained from each test possessed the desired characteristics of being substantially devoid of ice crystals and ice crystal agglomerates and having creamy consistency similar to that of conventionally produced non-alcohol-containing ice cream. However, it was noted that the higher the temperature of the initial cooling environment (the enclosed space), the less creamy the final texture of the single tempered mass. Therefore the faster the rate at which the alcohol-containing liquid Bailey's Irish Cream™ composition is frozen to the solid alcohol-containing Bailey's Irish Cream™ composition, the creamier the final texture of the product.

For example in the −50° C. initial freezing environment test, the rate of freezing and cooling of 100 ml of the alcohol-containing liquid Bailey's Irish Cream™ composition from +2° C. to about −50° C. to form the solid Bailey's Irish Cream™ composition was about 30 minutes. At this freezing rate the desired substantially single-phase solid alcohol-containing Bailey's Irish Cream™ composition and thus creamy final product was attained. As noted above, under conventional ice cream making freezing techniques and processes, the final product is not a substantially single-phase creamy-type product and includes ice crystals and/or ice crystal agglomerates. Under conventional ice cream making techniques where the freezing takes places at about from −5° C. to about −8° C., solidification of 100 ml of the alcohol-containing liquid Bailey's Irish Cream™ composition takes several hours and the composition is not frozen to a solid, but rather cooled to a "soft serve" or still flowable consistency having ice crystal agglomerates therein. Therefore, testing of the instantly described process for making an alcohol-containing frozen comestible shows that the rate at which the alcohol-containing liquid composition is frozen into the single-phase solid alcohol-containing admixture affects the degree of creaminess and final texture of the final product where the faster the rate of freezing and the lower the temperature of the initial freezing leads to a creamier and improved final texture over that of conventional ice cream freezing techniques.

The resultant frozen single-phase solid alcohol-containing admixture is then warmed or, in other words, tempered to a consistency or softness of conventional ice cream and in some embodiments re-hardened following tempering. In contrast, in the production a conventional non-alcohol-containing ice cream, the liquid composition is cooled to a still flowable state or soft ice cream consistency and then further cooled to a harder consistency.

EXAMPLE 5

In another exemplary embodiment, Scotch whiskey was diluted from a 40% alcohol content per volume to about 17% per volume using cream to form the liquid alcohol composition. The resultant Scotch whiskey liquid composition was introduced to a liquid nitrogen bath and flash frozen to a solid Scotch whiskey composition so as to produce solidified, solid Scotch whiskey pieces. The solid Scotch whiskey pieces were then packaged in 500 ml cylindrical vessels and subjected to an environment having a temperature of about −25° C. for a time period of about 12 hours until the solid Scotch whiskey pieces had tempered and substantially melded into a single tempered and melded mass of the solidified Scotch whiskey composition. The solidified Scotch whiskey composition, being melded into a single tempered and melded mass, was then subjected to an environment having a temperature of about −100° C. for re-hardening and then, once re-hardened, stored at a temperature of about −35° C.

EXAMPLE 6

In another example, 500 ml of Scotch whiskey diluted from an alcohol content of 40% per volume to about 17% per volume with cream was placed into a 1 L vessel (fist vessel). The first vessel was then placed in an enclosed space (second vessel) with liquid nitrogen. The liquid nitrogen was not in direct contact with first vessel. As the liquid nitrogen converted to a gas, the cold nitrogen gas or vapours cooled the enclosed space to a temperature of about −60° C., as measured by an infrared thermometer. The temperature of the Scotch whiskey and cream composition was allowed to equilibrate to the −60° C. temperature of the enclosed space and thus solidify to a single-phase solid alcohol-containing admixture. Once frozen, the solid alcohol-containing Scotch whiskey and cream composition was stored overnight at about −30° C. to temper to a softened single tempered mass relative the solid alcohol-containing Scotch whiskey and cream composition, as described above. The resultant product showed similar consistency characteristics to that of the embodiment of Example 5, that being substantially devoid of ice crystals and ice crystal agglomerates, yet having a creamy consistency similar to that of conventional non-alcoholic ice cream.

Although this disclosure has described and illustrates certain exemplary embodiments of the invention, it is to be understood that the invention is not restricted to those particular embodiments. Rather, the invention includes all embodiments which are functional or physical equivalents of the specific embodiments and features that have been described and illustrated.

Those of skill in the art will recognize certain modifications, permutations, additions and sub-combinations of the materials, components, process and steps noted herein. While a process for producing an alcohol-containing frozen comestible and products thereof is provided for what are presently considered preferred and exemplary embodiments, the invention is not so limited. To the contrary, the invention is intended to cover various modifications and equivalent materials included within the spirit and scope of the appended claims. The scope of the following claims is to be accorded the broadest interpretation so as to encompass all such modifications and equivalent materials and functions thereof.

What is claimed is:

1. An alcohol-containing frozen comestible having at least a portion thereof of a tempered and hardened frozen alcohol-containing composition having a substantially uniform consistency, said tempered and hardened frozen alcohol-containing composition being substantially devoid of ice crystal striations and ice crystal agglomerations, said tempered and hardened frozen alcohol containing composition comprising from about 16% to about 24% of a sugar component, from about 12% to about 20% of a fat component and from about 15% to about 22% of an alcohol component.

2. The alcohol-containing frozen comestible as defined in claim 1, wherein said tempered and hardened frozen alcohol-containing composition comprises from about 17% to about 19% of said alcohol component.

3. The alcohol-containing frozen comestible as defined in claim 1, wherein said tempered and hardened frozen alcohol-containing composition comprises about 20% of said sugar component, about 16% of said fat component, and from about 15% to about 22% of said alcohol component.

4. The alcohol-containing frozen comestible as defined in claim 1, further comprising an ice cream portion, a sorbet portion, a frozen yogurt portion, or a frozen dairy product portion, and wherein said portion consisting of said tempered and hardened frozen alcohol-containing composition is encapsulated or is interlaced in said ice cream portion, said sorbet portion, said frozen yogurt portion, or said frozen dairy product portion.

5. The alcohol-containing frozen comestible as defined in claim 4, wherein said portion consisting of said tempered and hardened frozen alcohol-containing composition is visually distinct from said ice cream portion, said sorbet portion, said frozen yogurt portion, or said frozen dairy product portion.

6. The alcohol-containing frozen comestible as defined in claim 4, wherein said portion consisting of said tempered and hardened frozen alcohol-containing composition is at least one visually distinct vein, striation, or pocket in said ice cream portion, said sorbet portion, said frozen yogurt portion, or said frozen dairy product portion.

7. The alcohol-containing frozen comestible as defined in claim 1, wherein said portion consisting of said tempered and hardened frozen alcohol-containing composition consists of from about 16% to about 24% of said sugar component, from about 12% to about 20% of said fat component, from about 15% to about 22% of said alcohol component, and a remaining portion, and
wherein said remaining portion comprises water and optionally, at least one flavoring ingredient and/or at least one preservative.

8. The alcohol-containing frozen comestible as defined in claim 7, wherein said portion consisting of said tempered and hardened frozen alcohol-containing composition comprises from about 17% to about 19% of said alcohol component.

9. The alcohol-containing frozen comestible as defined in claim 7, wherein said portion consisting of said tempered and hardened frozen alcohol-containing composition is made by a process comprising:
   a) tempering at least one solid piece of a single-phase solid admixture at a tempering temperature between about −30° C. to about −15° C., said single-phase solid admixture comprising from about 16% to about 24% of said sugar component, said about 12% to about 20% of said fat component, said about 15% to about 22% of said alcohol component, said water and optionally said at least one flavoring ingredient and optionally said at least one preservative, to form at least one single-phase tempered alcohol-containing mass that is substantially devoid of said ice crystal agglomerations and ice crystal striations; and then
   b) after step a), re-cooling said at least one single-phase tempered alcohol-containing mass to cause re-hardening at a hardening temperature of about −35° C. or less, in order to form said tempered and hardened frozen alcohol-containing composition.

10. The alcohol-containing frozen comestible as defined in claim 6, wherein said process further comprises placing a liquid composition comprising from about 16% to about 24% of said sugar component, from about 12% to about 20% of said fat component and from about 15% to about 22% of said alcohol component, said water, optionally said flavoring ingredient and optionally said at least one preservative in a cooling environment at a cooling environment temperature that is less than about −40° C., in order to cool said liquid composition sufficiently rapidly so as to form said at least one solid piece of said single-phase solid admixture without said ice crystal striations and without said ice crystal agglomerations prior to said tempering of step a).

11. The alcohol-containing frozen comestible as defined in claim 9, wherein said at least one solid piece consists of a plurality of solid pieces of said single-phase solid admixture.

12. The alcohol-containing frozen comestible as defined in claim 1 wherein said hardened alcohol containing composition is fractured into a plurality of solid single-phase admixture pieces.

13. The alcohol-containing frozen comestible as defined in claim 1 wherein said hardened alcohol containing composition is re-cooled to a temperature to effect re-hardening to produce a re-hardened mass.

14. The alcohol-containing frozen comestible as defined in claim 1 wherein said re-hardening temperature is below about −30° C.

15. The alcohol-containing frozen comestible as defined in claim 1 wherein said hardened alcohol containing composition is encapsulated in an ice cream, a sorbet, a frozen yogurt or a frozen dairy product.

16. The alcohol containing frozen comestible according to claim 1 wherein said composition has veins, striations and/or pockets of said single-phase solid admixture or said plurality of single-phase solid alcohol admixture pieces interlaced within said non-alcohol-containing composition by at least partial mixing of said single-phase solid admixture or said plurality of single-phase solid alcohol admixture pieces with said non-alcohol-containing composition to form said alcohol-containing composition and non-alcohol-containing visually distinct aggregation.

* * * * *